(12) United States Patent
Welling

(10) Patent No.: US 11,801,637 B2
(45) Date of Patent: Oct. 31, 2023

(54) FILAMENT FEEDER

(71) Applicant: Ultimaker B.V., Geldermalsen (NL)

(72) Inventor: Kornelis Hermanus Welling, Utrecht (NL)

(73) Assignee: Ultimaker B.V., Geldermalsen (NL)

( * ) Notice: Subject to any disclaimer, the term of this patent is extended or adjusted under 35 U.S.C. 154(b) by 0 days.

(21) Appl. No.: 17/798,606

(22) PCT Filed: Jan. 19, 2021

(86) PCT No.: PCT/NL2021/050031
§ 371 (c)(1),
(2) Date: Aug. 10, 2022

(87) PCT Pub. No.: WO2021/162541
PCT Pub. Date: Aug. 19, 2021

(65) Prior Publication Data
US 2023/0101979 A1    Mar. 30, 2023

(30) Foreign Application Priority Data
Feb. 12, 2020 (NL) ...................... 2024881

(51) Int. Cl.
*B29C 64/321* (2017.01)
*B29C 64/118* (2017.01)
(Continued)

(52) U.S. Cl.
CPC .......... *B29C 64/321* (2017.08); *B29C 64/118* (2017.08); *B29C 64/209* (2017.08); *B33Y 30/00* (2014.12); *B33Y 40/00* (2014.12)

(58) Field of Classification Search
CPC ... B29C 64/321; B29C 64/118; B29C 64/209; B33Y 30/00; B33Y 40/00
See application file for complete search history.

(56) References Cited

U.S. PATENT DOCUMENTS 6,129,872 A    10/2000  Jang
2017/0266885 A1*  9/2017  Gifford ................. B29C 64/321

FOREIGN PATENT DOCUMENTS

EP    3501795 A1    6/2019
FR    3022826 A1    1/2016

* cited by examiner

*Primary Examiner* — Joseph S Del Sole
*Assistant Examiner* — John Robitaille
(74) *Attorney, Agent, or Firm* — N.V. Nederlandsch Octrooibureau

(57) ABSTRACT

A filament feeder (1) for use in a fused filament fabrication printer comprises a feeder body (2) which comprises a channel (3) for guiding a filament (F) there through. A first and a second driven grip roller (4, 5) are arranged on opposing sides of the channel (3) for clamped engagement with the filament (F), wherein the first grip roller (4) is rotationally arranged about a first roller axis (4a) and the second grip roller (5) is rotationally arranged about a second roller axis (5a). The feeder comprises a first drive gear (6) for driving the first grip roller (4), the first drive gear (6) being rotatably arranged about the first roller axis (4a), a second drive gear (7) for driving the second grip roller (5), the second drive gear being rotatably arranged about the second roller axis (5a), and a suspension system (S) for suspension of the first and second grip roller (4,5) and of the first and second drive gear (6,7). The suspension system (S) is arranged to allow lateral movement of the first and second grip rollers (4, 5) with respect to the channel (3) for providing a variable distance (D+ΔD) between the first and second roller axes (4a, 5a).

22 Claims, 14 Drawing Sheets

(51) Int. Cl.
*B29C 64/209* (2017.01)
*B33Y 30/00* (2015.01)
*B33Y 40/00* (2020.01)

FILAMENT FEEDER

FIELD OF THE INVENTION

The present invention relates to a filament feeder for use in a fused filament fabrication (FFF) printer. The invention further relates to a print head comprising the filament feeder, and to a fused filament printer comprising the filament feeder.

BACKGROUND ART

International application WO 2008/100467 A1 discloses a filament delivery assembly comprising a gear system having two rotatable drive rollers that grip and pull a filament from a filament tube. The filament delivery assembly comprises a support plate to which a feeder block is secured and wherein the feeder block includes a channel through which filament is guided towards the two drive rollers. One of the two drive rollers may be pivotally secured to the support plate so as to provide a mechanism that self corrects for filament slippage between two drive rollers.

Prior art filament delivery assemblies such as those described above do not allow the two drive rollers to remain symmetrically arranged or centred with respect to the feed channel when the distance between the two rotatable rollers changes. As a result, the feed channel must be wider to allow for lateral eccentricity of filament within the feed channel when the distance between the two rollers changes.

SUMMARY OF THE INVENTION

The present invention seeks to provide a filament feeder which solves at least one of the problems mentioned above.

According to a first aspect of the present invention, there is provided a filament feeder comprising a feeder body which comprises a channel for guiding a filament there through. A first and a second driven grip roller are arranged on opposing sides of the channel for clamped engagement with the filament, wherein the first grip roller is rotationally arranged about a first roller axis and wherein the second grip roller is rotationally arranged about a second roller axis. A first drive gear is provided for driving the first grip roller, wherein the first drive gear is rotatably arranged about the first roller axis. A second drive gear is provided for driving the second grip roller, wherein the second drive gear is rotatably arranged about the second roller axis. The filament feeder further comprises a suspension system for suspension of the first and second grip roller and of the first and second drive gear, wherein the suspension system is arranged to allow lateral movement of the first and second grip rollers with respect to the channel for providing a variable distance between the first and second roller axes.

According to the present invention, the suspension system S allows both the first and second driven grip rollers move laterally with respect to the channel to ensure that the first and second grip rollers remain symmetrically arranged with respect to the channel should the filament increase in width or size between the first and second grip rollers. By maintaining the symmetric position of the first and second grip rollers with respect to the channel avoids buckling or bending of the filament when it is pulled through the filament feeder by the first and second grip rollers. That is, the laterally movable first and second grip rollers allow the filament to remain centred within the channel, thereby avoiding buckling of the filament.

In an embodiment, wherein first roller axis is arranged at a first channel distance with respect to a centre axis of the channel and wherein second roller axis is arranged at a second channel distance with respect to the centre axis of the channel, and wherein the first and second channel distances are variable over substantially equal first and second lateral displacements, respectively. This allows symmetric clamping of the filament F that becomes wider or narrower.

In an embodiment, the suspension system comprises resilient suspension members arranged to resiliently bias the first and the second grip rollers to the filament. This allows consistent and symmetric push forces on the filament imposed by both grip rollers for a varying width of the filament.

In an embodiment, the suspension system comprises a first and a second support plate mounted on opposing sides of the feeder body, wherein the first support plate comprises a first and a second support portion, and wherein the second support plate comprises a third and a fourth support portion; wherein the first and the second grip rollers each comprise a first and a second roller shaft, respectively, and wherein the first roller shaft is suspended by the first and third support portion and wherein the second roller shaft is suspended by the second and fourth support portion, and wherein the first, second, third and fourth support portions are laterally movably with respect to the channel. The first, second, third, and fourth support portion allow for a simple, swing arm arrangement to provide symmetrical movement of the first and second grip rollers with respect to the channel.

In an embodiment, the first, second, third and fourth support portions are pivotally arranged in a respective plane of the first and second support plate, thereby minimizing the thickness of the total feeder.

In an embodiment, the first support plate comprises a first and a second pivot portion and wherein the second support plate comprises a third and fourth pivot portion, wherein the first and second pivot portion pivotally connect the first support plate to the first and second support portion, and wherein the third and fourth pivot portion pivotally connect the second support plate to the third and fourth support portion. This provides an effective pivot mechanism to allow lateral movement of the first and second grip roller.

In an embodiment, the first support plate, the first and second support portion and the first and second pivot portion form a single piece, and wherein the second support plate, the third and fourth support portion and the third and fourth pivot portion form a single piece. This allows for a simpler and cost-effective design for the filament feeder.

In an embodiment, the first support plate, comprises a laterally resilient first biasing portion connecting the first and second support portion, and wherein the second support plate comprises a laterally resilient second biasing portion connecting the third and fourth support portion. This embodiment achieves resilient engagement of the first and second grip rollers to the filament F.

In an embodiment, the first biasing portion and the first and second support portion form a single piece, and wherein the second biasing portion and the third and fourth support portion form a single piece. This provides for sufficient structural integrity to support the first and second grip rollers whilst at the same time provide sufficient resiliency to allow for lateral movement of the first and second grip rollers.

In an embodiment, the first support portion comprises a first lateral inward projection and wherein the second support portion comprises a second lateral inward projection, wherein the suspension system is configured to allow abutment of the first and second lateral inward projections when the variable distance reaches a lower limit. Through such inward projections it is possible to prevent the variable distance from becoming too small.

In an embodiment, the third support portion comprises a third lateral inward projection and wherein the fourth support portion comprises a fourth lateral inward projection, wherein the suspension system is configured to allow abutment of the third and fourth lateral inward projections when the variable distance reaches a lower limit. Through such inward projections it is possible to prevent the variable distance from becoming too small.

In an embodiment, the first support portion comprises a first lateral outward projection and wherein the second support portion comprises a second lateral outward projection, and wherein the suspension system S is configured to allow abutment of the first and second lateral outward projections with opposing edges of the first support plate or of the feeder body when the variable distance reaches an upper limit. Through such outward projections it is possible to prevent the variable distance to become too large.

In an embodiment, the third support portion comprises a third lateral outward projection and wherein the fourth support portion comprises a fourth lateral outward projection, and wherein the suspension system is configured to allow abutment of the third and fourth lateral outward projections with opposing edges of the second support plate or of the feeder body when the variable distance reaches an upper limit. Through such outward projections it is possible to prevent the variable distance to become too large.

In an embodiment, the first support plate comprises an adjustable first lever portion having a first lever end and a second lever end, the first lever end being pivotally connected to the feeder body at a first lever pivot point, and wherein the second support plate comprises an adjustable second lever portion having a third lever end and a fourth lever end, the third lever end being pivotally connected to the feeder body at a second lever pivot point, wherein the first lever portion is connected to the first and second support portions between the first lever end and the second lever end for laterally positioning the first and second portions with respect to the channel, and wherein the second lever portion is connected to the third and fourth support portions between the third lever end and the fourth lever end and for laterally positioning the third and fourth support portions with respect to the channel. This pivots the first and second lever portions 30, 31 and as a result laterally moves the first, second, third and fourth support portions in particular the first and second grip rollers with respect to the channel.

In an embodiment, the first support plate comprises a first and a second pivot portion and wherein the second support plate comprises a third and fourth pivot portion, wherein the first and second pivot portion pivotally connect the first and second support portion, respectively, and the first lever portion, and wherein the third and fourth pivot portion pivotally connect to the third and fourth support portion, respectively, and the second lever portion. In this embodiment the first, second, third and fourth pivot portions provide a symmetric arrangement of the first, second, third and fourth support portions with respect to the channel, thereby imposing a shape fixed linkage between the first and second lever portion, and the first, second third and fourth support portions.

In an embodiment, the first lever portion, the first and second pivot portions, and the first and second support portions form a single piece, and wherein the second lever portion, the third and fourth pivot portions, and the third and fourth support portions form a single piece. This embodiment facilitates cost effective manufacturing and provide a thin suspension system S.

In an embodiment, the second and fourth lever ends are resiliently connected to the feeder body to obtain biased engagement of the first and second grip rollers toward the channel, i.e. the filament.

In an embodiment, the first drive gear and the first grip roller form a single piece, and wherein the second drive gear and the second grip roller form a single piece. A circumferentially arranged round first groove is provided to the first grip roller and wherein a circumferentially arranged round second groove is provided to the second grip roller. The first and second grooves are configured for clamped engagement with the filament F. This embodiment provides rounded grooves for evenly distributed grip on a round filament F, for example. Also, geared engagement between the first and drive gears on both sides of the grooves is provided, such that tooth forces imposed on the first drive gear are symmetrically arranged with respect to the first groove and tooth forces imposed on the second drive gear are symmetrically arranged with respect to the second groove. As a result, the first and second roller shafts are evenly loaded along their lengths.

In an alternative embodiment, the first drive gear and the first grip roller form a single piece provided with a circumferentially arranged V-shaped first groove, wherein the second drive gear and the second grip roller form a single piece provided with a circumferentially arranged V-shaped second groove, wherein the first and second groove are configured for clamped engagement with the filament. The first and second V-shaped grooves may allow stronger pulling forces on the filament when required.

In an embodiment, the first and second groove may each comprise a flattened bottom part provided with a protruding surface texture configured to increase grip on the filament.

In an embodiment, the filament feeder comprises a driven worm gear in meshed engagement with the first or the second drive gear. The worm gear allows for a compact design and can be arranged in various angles while maintaining meshed engagement with the first or second drive gear.

In a second aspect of the present invention, a print head is provided comprising a filament feeder as described above.

In a third aspect of the present invention, an FFF printer is provided comprising a filament feeder as described above.

SHORT DESCRIPTION OF DRAWINGS

The present invention will be discussed in more detail below, with reference to the attached drawings, in which FIG. 1 shows a perspective view of a feeder according to an embodiment of the invention;

Figure 13:
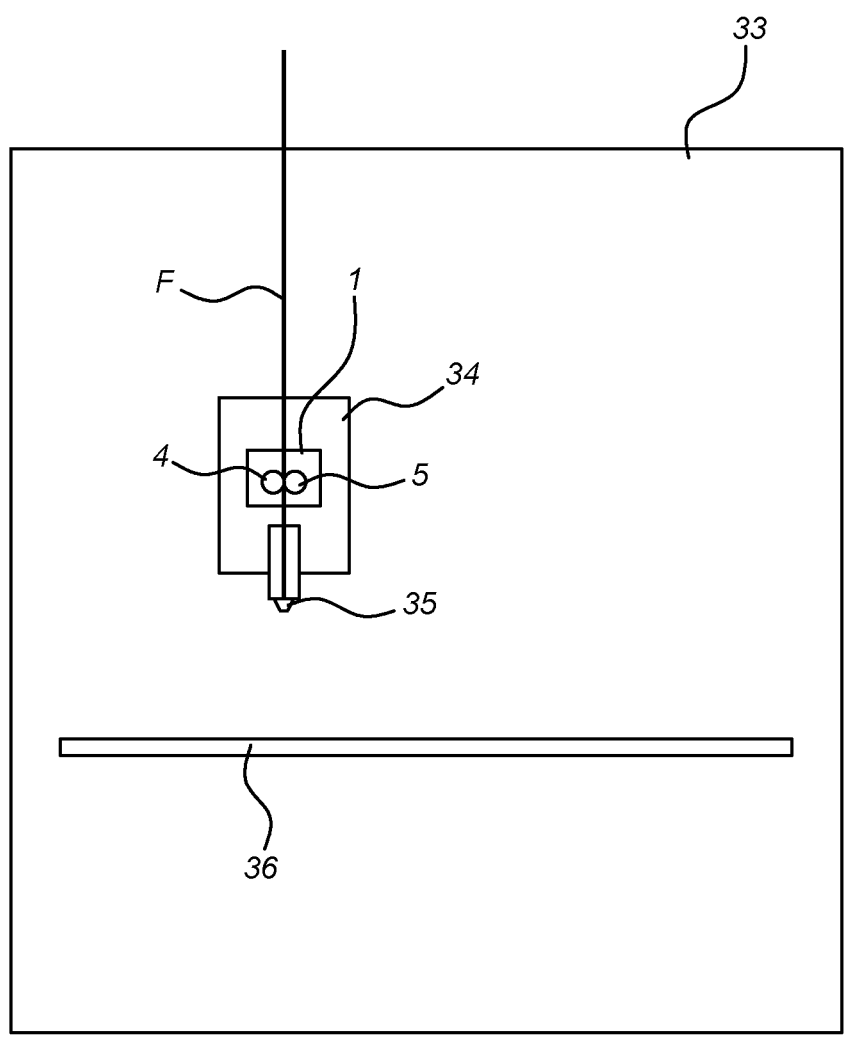

FIG. 13 schematically shows an FFF printer with a print head comprising the filament feeder.

DESCRIPTION OF EMBODIMENTS

Figure 1:
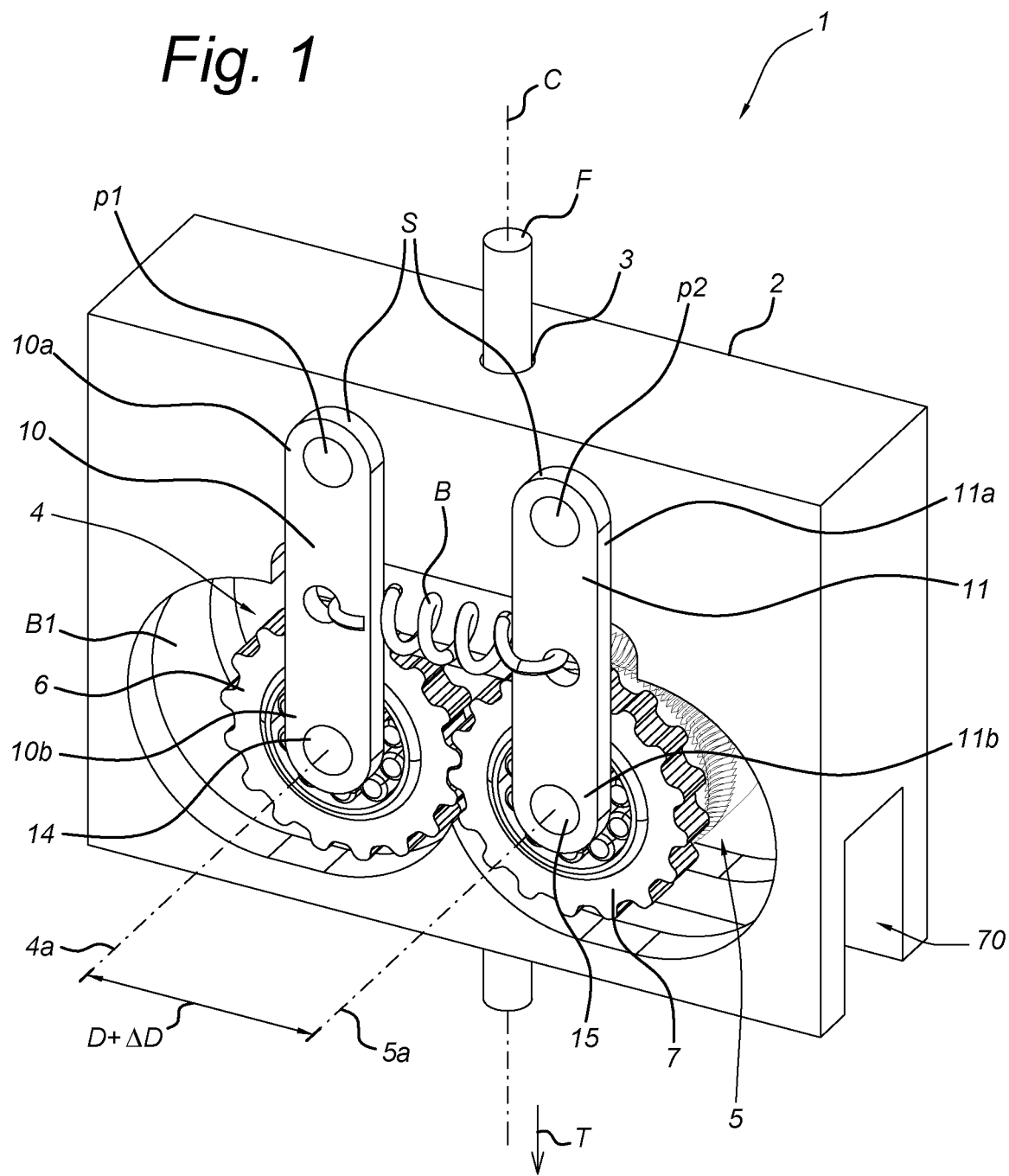
Figure 2:
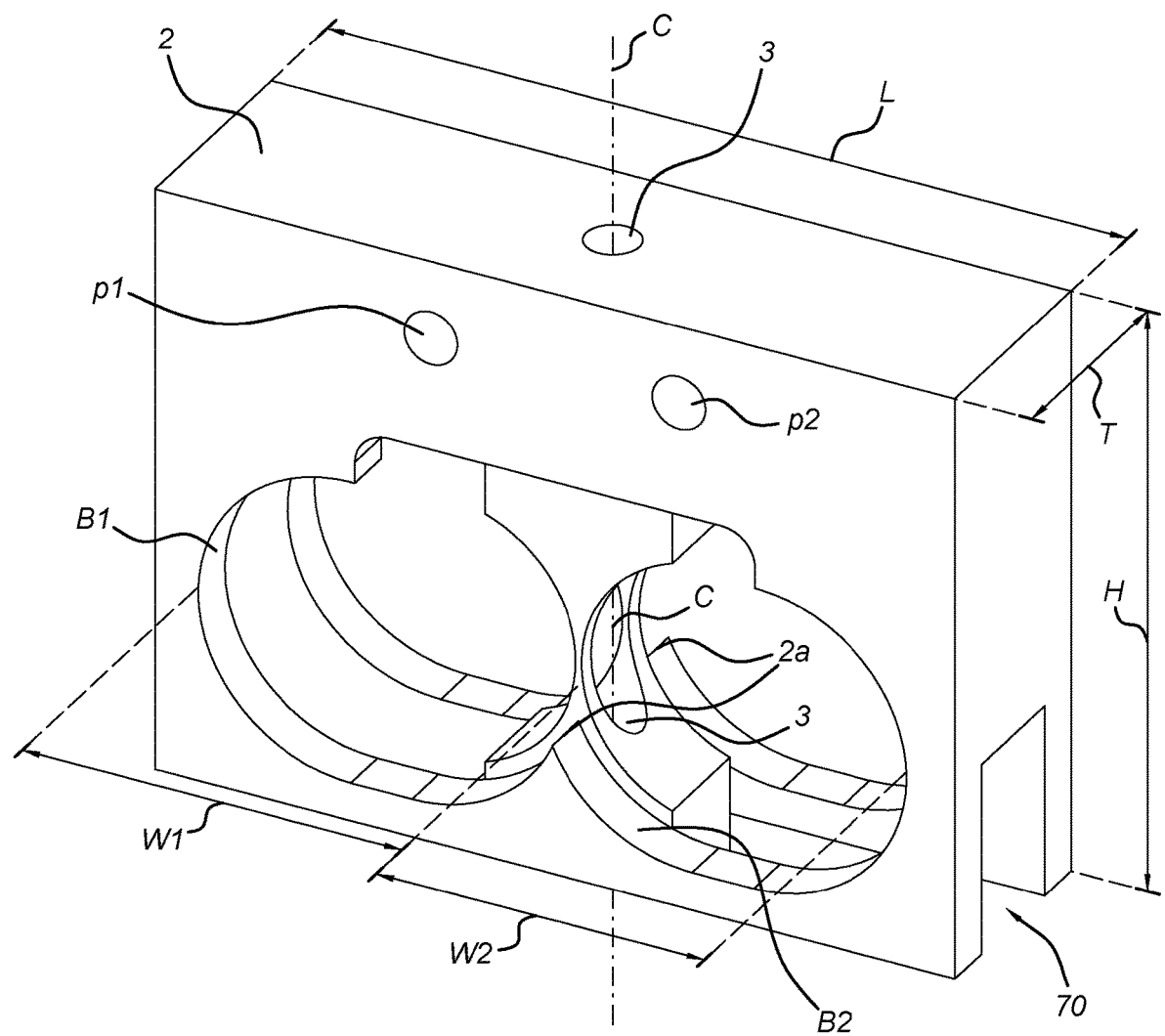
FIG. 2 shows a perspective view of the feeder body of the embodiment of FIG. 1.

In FIG. 1 a perspective view of a filament feeder is shown according to an embodiment of the invention, wherein FIG. 2 shows a perspective view of a feeder body of the embodiment of FIG. 1. As shown, the filament feeder 1 comprises a feeder body 2 having a channel 3 for guiding a filament F there through. In this embodiment, the feeder body 2 is a substantially block-shaped body having several bores, one of which constitutes the channel 3, and two others provide space for grip rollers and gear wheels. In the following, the feeder body 2 is also referred to as feeder block 2, but is should be noted that the invention is not limited to the use of a block shaped body, other forms are conceivable depending on the application. As shown in FIG. 1, a first and a second driven grip roller 4, 5 are arranged on opposing sides of the channel 3 for clamped engagement with the filament F, wherein the first grip roller 4 is rotationally arranged about a first roller axis 4a and the second grip roller 5 is rotationally arranged about a second roller axis 5a.

A first drive gear 6 is then provided for driving the first grip roller 4 and a second drive gear 7 is provided for driving the second grip roller 5. The first drive gear 6 and the second drive gear 7 are rotatably arranged about the first and second roller axis 4a, 5a, respectively.

It is noted that the first grip roller 4 is not directly visible in FIG. 1 as is lies behind the first drive gear 6. However, the location of the first grip roller 4 can be inferred from the second grip roller 5 which is clearly visible in FIG. 1, i.e. the first grip roller 4 is arranged opposite to the second grip roller 5 on an opposing side of the channel 3. In the feeder block 2 openings 70 are arranged at both sides of the feeder 1. Debris coming from the filament F can be removed from the feeder 1 via these openings 70.

The filament feeder 1 further comprises a suspension system S for suspending the first and second grip rollers 4, 5 as well as the first and second drive gear 6, 7, wherein the suspension system S is arranged to allow lateral movement, e.g. substantially symmetric lateral movement, of the first and second grip rollers 4, 5 with respect to the channel 3 so as to provide for a variable distance D+AD between the first and second roller axes 4a, 5a.

According to the present invention, the suspension system S allows both the first and second driven grip rollers 4, 5 to move laterally with respect to the channel 3 to ensure that the first and second grip rollers 4, 5 remain symmetrically arranged with respect to the channel 3 should the filament F increase in width or size between the first and second grip rollers 4, 5. By maintaining the symmetric position of the first and second grip rollers 4, 5 with respect to the channel 3 avoids buckling or bending of the filament F when it is pulled through the filament feeder 1 by the first and second grip rollers 4, 5. That is, the laterally movable first and second grip rollers 4,5 allow the filament to remain centred within the channel 3, thereby avoiding buckling of the filament F. This is especially advantageous when using filament diameters of 1.75 mm or less where the risk of buckling is considerable.

In an advantageous, the suspension system S is adapted to resiliently bias the first and the second grip rollers 4, 5 to the filament F, thereby allowing consistent and symmetric push forces on the filament F imposed by both grip rollers 4, 5 for a varying width of the filament F. In exemplary embodiment, the suspension system S may comprise first and second movable support portions 10, 11 for supporting the first and second grip rollers 5, 4, respectively, wherein the first and second support portions 10, 11 are arranged to resiliently bias the first and the second grip rollers 4, 5 to the filament F.

Note that the first and the second grip roller 4, 5 may each comprise a first and a second roller shaft 14, 15, respectively, and wherein the first roller shaft 14 is suspended by the first support portion 10 and wherein the second roller shaft 15 is suspended by the second support portion 11.

In the depicted embodiment, the first support portion 10, 11 may be pivotally connected to the feeder block 2 at a first pivot point p1 and wherein the second support portion 11 may be pivotally connected to the feeder block 2 at a second pivot point p2. The pivot points p1, p2 are relatively thin portions of the support plate 8 which are flexible in the plane of the support plate 8. In this embodiment, when the first and second support portions 10, 11 move about the first and second pivot points p1, p2 results in lateral displacement of the first and the second grip rollers 4, 5, thus yielding the variable distance D+AD between the first and second roller axes 4a, 5a.

In the depicted exemplary embodiment, the first and second support portions 10, 11 may be seen as a first and second swing arm 10, 11, respectively, each which comprises a first and second pivot end 10a, 11a, respectively, connected to the feeder block 2 at the first and second pivot point p1, p2, respectively. Then each of the first and second swing arms 10, 11 comprises a first and second roller end 10b, 11b, respectively, supporting the first and second grip roller 4, 5.

A spring-loaded biasing member B may be connected between the first and second support portions 10, 11, i.e. the first and second swing arms 10, 11 as seen in the embodiment. The biasing member B is arranged to resiliently pivot swing arms 10, 11 such that the first and second grip rollers 4, 5, resiliently push toward the channel 3, i.e. the filament F.

FIG. 2 shows a perspective view of the feeder block 2 of the embodiment of FIG. 1. As shown, the feeder block 2 comprises the channel 3 through which the filament F extends when the filament feeder 1 is in operation. The feeder block 2 comprises a first through bore B1 to allow the first grip roller 4 to extends there through, and a second through bore B2 is provided to allow the second grip roller 5 to extend there through. The first and second through bore B1, B2 each have a sufficiently large lateral width W1, W2 to allow the first and second grip rollers 4, 5 to move in lateral direction to achieve the variable distance D+AD between the first and second roller axes 4a, 5a. In an advantageous embodiment, the first and second bores B1, B2 may overlap in such a way that a cut-out 2a in the feeder block 2 is obtained so that the first and second drive gears 6, 7 can be arranged in the first and second bore B1, B2, respectively, while also being able to be in meshed engagement with each other. As shown, the cut-out 2a aligns with the centre axis C of the channel 3.

In an embodiment, the feeder block 2 may be made of metal for strength and durability, such as aluminium to reduce weight as much as possible but to maintain sufficient strength. Of course, in an alternative embodiment the feeder block 2 may be made of a durable plastic material to minimize weight, possibly a fibre reinforced plastic material for improved strength. In an exemplary embodiment, the feeder block 2 may have dimensions between 20-40 mm in length (L), 10-30 mm in height (H), and 5-20 mm in thickness (T).

Figure 3:
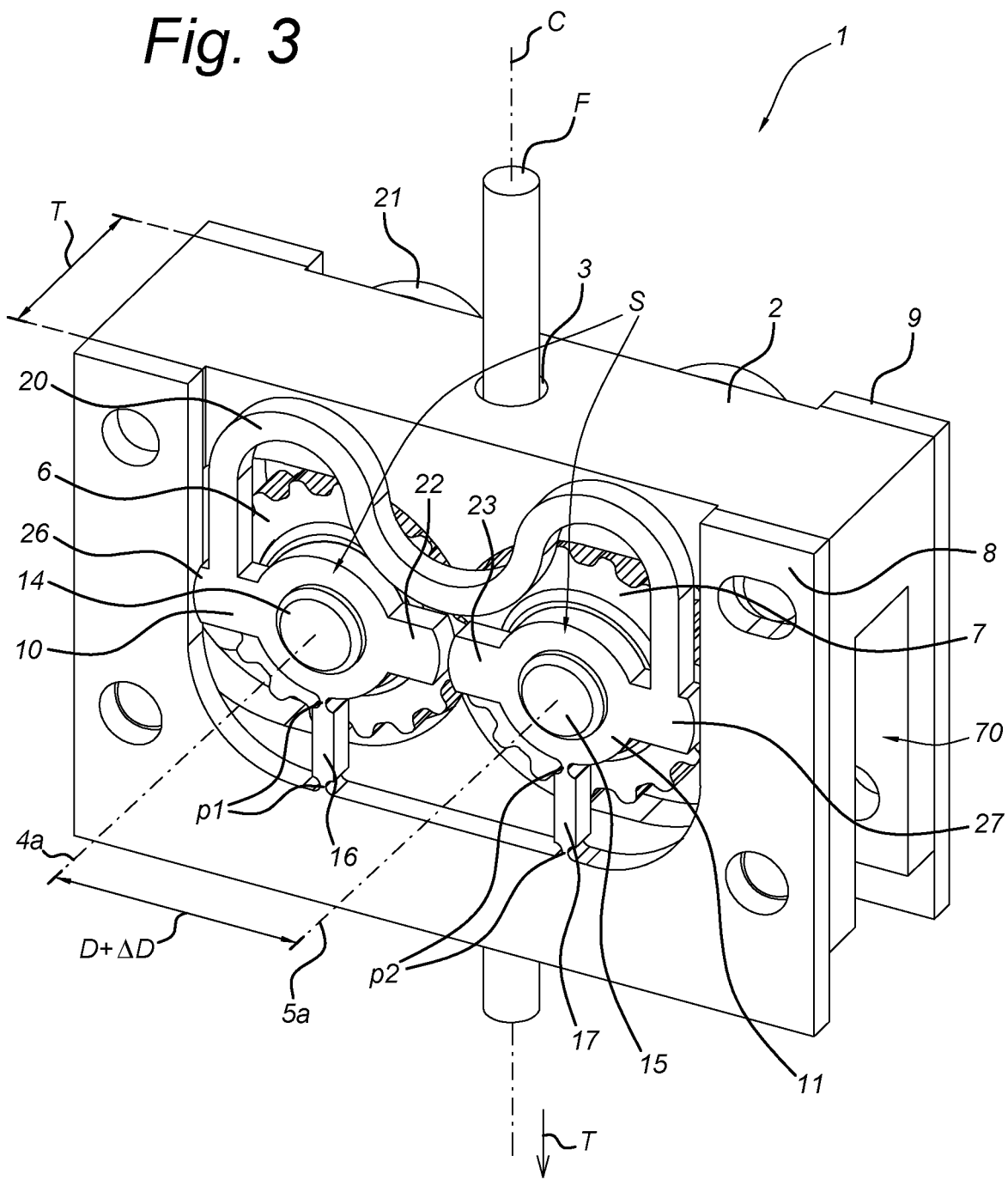
FIGS. 3 and 4 show opposing side views a filament feeder device according to an embodiment of the present invention.
Figure 4:
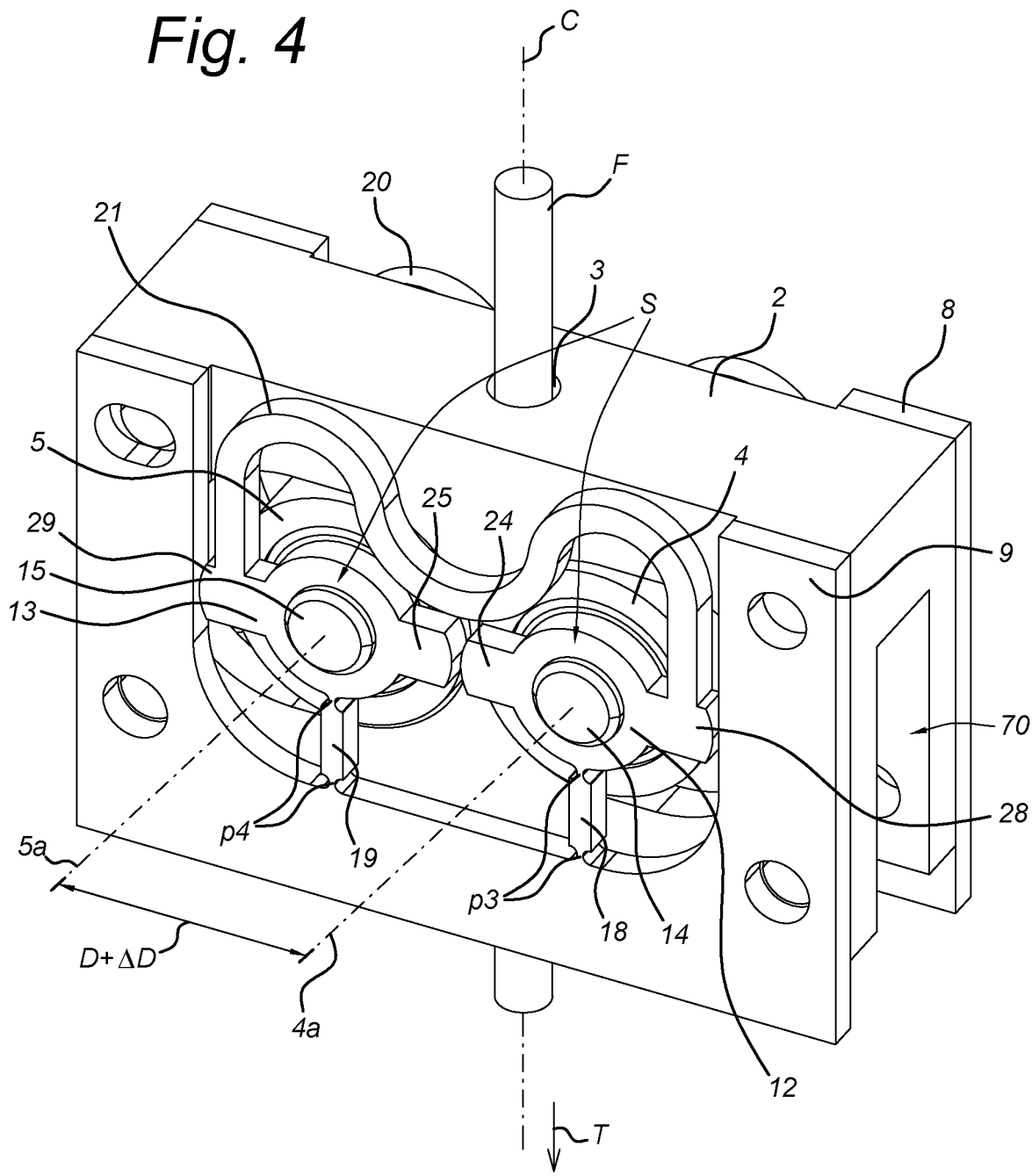
Figure 5:
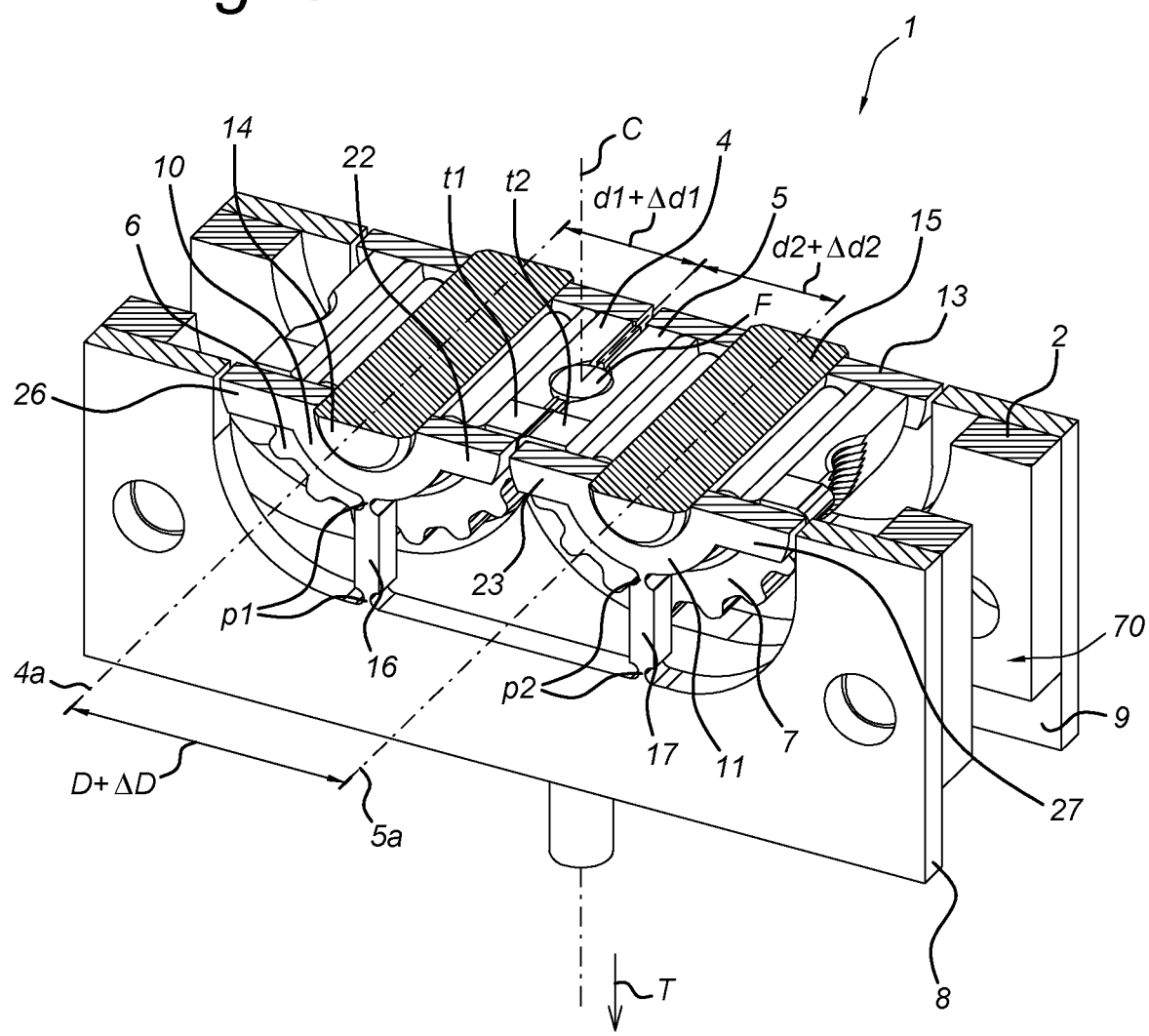
FIG. 5 shows a cross section of a filament feeder device according to an embodiment of the present invention.

In FIGS. 3 and 4 opposing side views of a filament feeder 1 are depicted according to an embodiment of the present invention, where FIG. 5 shows a cross section of the filament feeder 1 as depicted by the embodiment of FIGS. 3 and 4. In the embodiment shown, the first roller axis 4a is arranged at a first channel distance d1 with respect to the centre axis C of the channel 3 and wherein second roller axis 5a is arranged at a second channel distance d2 with respect to the centre axis C of the channel, and wherein the first and second channel distances (d1, d2) are variable over substantially equal first and second lateral displacements $\Delta d1$, $\Delta d2$, respectively. Here, the first and second lateral displacement $\Delta d1$, $\Delta d2$ may each be positive or negative to allow symmetric clamping of the filament F that becomes wider or narrower.

It is important to note that in the depicted cross section of FIG. 5 it is seen that the first and second drive gear 6, 7 are in direct meshed engagement as exemplified by engaged teeth t1, t2. Moreover, this meshed engagement between the first and second drive gear 6, 7 is maintained for the variable distance D+AD between the first and second roller axes 4a, 5a. That is, the first and second lateral displacement $\Delta d1$, $\Delta d2$ remain sufficiently small such that the teeth t1, t2 remain engaged. Having direct engagement between the first and second drive gears 6, 7 simplifies driving the first and second gript roller 4, 5 in opposite directions.

The suspension system S as mentioned above can be embodiment in various ways. For example, in the depicted embodiment of FIGS. 3 and 4, the suspension system comprises a first and a second support plate 8, 9 mounted on opposing sides of the feeder block 2. The first support plate 8 comprises a first and a second support portion 10, 11, and wherein the second support plate 9 comprises a third and a fourth support portion 12, 13. The first and the second grip rollers 4, 5 each comprise a first and a second roller shaft 14, 15, respectively, and wherein the first roller shaft 14 is suspended by the first and third support portion 10, 12 and wherein the second roller shaft 15 is suspended by the second and fourth support portion 11, 13. To achieve lateral movability of the first and second grip rollers 4, 5, the first, second, third and fourth support portions 10, 11, 12, 13 are laterally movably with respect to the channel 3.

The first, second, third and fourth support portions 10, 11, 12, 13 may be pivotally arranged in a respective plane of the first and second support plate 8, 9, thereby minimizing the thickness T of the feeder block 2 for example.

In an embodiment, the first support plate 8 comprises a first and a second pivot portion 16, 17 and wherein the second support plate 9 comprises a third and fourth pivot portion 18, 19, wherein the first and second pivot portion 16, 17 pivotally connect the first support plate 8 to the first and second support portion 10, 11, respectively. The third and fourth pivot portion 18, 19 pivotally connect the second support plate 9 to the third and fourth support portion 12, 13, respectively. In this embodiment an effective pivot mechanism is achieved to allow lateral movement of the first and second grip roller 4,5.

As depicted, the first and second support portions 10, 11 may be pivotally connected to the feeder block 2, i.e. the first support plate 8, through first and second pivot points p1, p2 respectively. The third and fourth support portions 12, 13 may be pivotally connected to the feeder block 2, i.e. the second support plate 9, through third and fourth pivot points p3, p5 respectively.

In an advantageous embodiment, the first support plate 8, the first and second support portion 10, 11 and the first and second pivot portion 16, 17 form a single piece, and wherein the second support plate 9, the third and fourth support portion 12, 13 and the third and fourth pivot portion 18, 19 form a single piece.

Having these single piece components allows for a simpler and cost-effective design for the filament feeder 1. For example, the first and second support plate 8, 9 may each be made of a sheet-based material (e.g. sheet metal) which is then stamped such that the first, second, third, and fourth support portions 10, 11, 12, 13 and the first, second, third and fourth pivot portions 16, 17, 18, 19 are integrally formed. Here, each of the first, second, third and fourth pivot portions 16, 17, 18, 19 may be seen as a swing arm that is sufficiently thin to allow for resilient behaviour at the first, second, third and fourth pivot points p1, p2, p3, p4. To increase resilient behaviour, each of the first, second, third and fourth pivot portions 16, 17, 18, 19 may comprise two opposing narrowed ends for obtaining the associated pivot points p1, p2, p3, p4.

To achieve resilient engagement of the first and second grip rollers 4, 5 to the filament F, an embodiment is provided wherein the first support plate 8, comprises a laterally resilient first biasing portion 20 connecting the first and second support portion 10, 11, and wherein the second support plate 9 comprises a laterally resilient second biasing portion 21 connecting the third and fourth support portion 12, 13. Here, the first biasing portion 20 connects the first and second support portion 10, 11 in resilient manner and the second biasing portion 21 connects the third and fourth support portion 12, 13 in resilient manner so that lateral movement of the first and second grip rollers 4, 5, is possible and wherein the first and second grip rollers 4, 5 are biased toward the channel 3, i.e. toward the filament F.

In the exemplary embodiment of FIGS. 3 and 4, the first biasing portion 20 may comprise a U-shaped or arched piece for providing a resilient connection between the first and second support portion 10, 11. Likewise, the second biasing portion 21 may comprise a U-shaped or arched piece for providing a resilient connection between the third and fourth support portion 10, 11.

In an advantageous embodiment, the first biasing portion 20 and the first and second support portion 10, 11 form a single piece, and wherein the second biasing portion 21 and the third and fourth support portion 12, 13 form a single piece. This provides for sufficient structural integrity to support the first and second grip rollers 4, 5 whilst at the same time provide sufficient resiliency to allow for lateral movement of the first and second grip rollers 4, 5. Furthermore, such single pieces allow for a cost-effective design for the filament feeder 1, for example, by stamping the first biasing portion 20 and the first and second support portion 10, 11 from a single piece of sheet material (e.g. sheet metal), and by stamping the second biasing portion 21 and the third and fourth support portion 12, 13 from a single piece of sheet material (e.g. sheet metal).

According to the invention, the suspension system S is arranged to allow lateral movement of the first and second grip rollers 4, 5 with respect to the channel 3 so as to provide for a variable distance D+AD between the first and second roller axes 4a, 5a. However, the variable distance D+AD may need to be kept above a lower limit to prevent too much clamping of the filament F and to keep the variable distance D+AD below an upper limit to prevent disengagement of the first and second drive gears 6, 7.

For example, in FIG. 3 it is shown that the first support portion 10 may comprise a first lateral inward projection 22 and wherein the second support portion 11 comprises a second lateral inward projection 23, and wherein the suspension system S is configured to allow abutment of the first and second lateral inward projections 22, 23 when the variable distance D+AD reaches a lower limit. Through such inward projections 22, 23 it is thus possible to prevent the variable distance D+AD from becoming too small. Likewise, in FIG. 4 it is shown that the third support portion 12 may comprise a third lateral inward projection 24 and wherein the fourth support portion 13 may comprise a fourth lateral inward projection 25, and wherein the suspension system S is configured to allow abutment of the third and fourth lateral inward projections 24, 25 when the variable distance D+AD reaches a lower limit. The inward projections 22, 23 also prevent the variable distance D+AD from becoming too small.

Conversely, to maintain the variable distance D+AD below an upper limit, an embodiment may be provided wherein the first support portion 10 comprises a first lateral outward projection 26 and wherein the second support portion 11 comprises a second lateral outward projection 27, and wherein the suspension system S is configured to allow abutment of the first and second lateral outward projections 26, 27 with the first support plate 8 when the variable distance D+AD reaches an upper limit.

Likewise, the third support portion 12 may comprises a third lateral outward projection 28 and wherein the fourth support portion 13 may comprise a fourth lateral outward projection 29, and wherein the suspension system S is configured to allow abutment of the third and fourth lateral outward projections 28, 29 with the second support plate 9 when the variable distance D+AD reaches an upper limit.

It is interesting to note that in an embodiment the first, second, third and fourth lateral outward projections 26, 27, 28, 29 may be arranged in a plane of the first and second support plates 8, 9 to allow abutment therewith as depicted in FIGS. 3 and 4. That is, in this embodiment the outward projections 26, 27, 28, 29 are flush with the respective first and second support plates 8, 9, thereby minimize the thickness T of the filament feeder 1.

Figure 6:
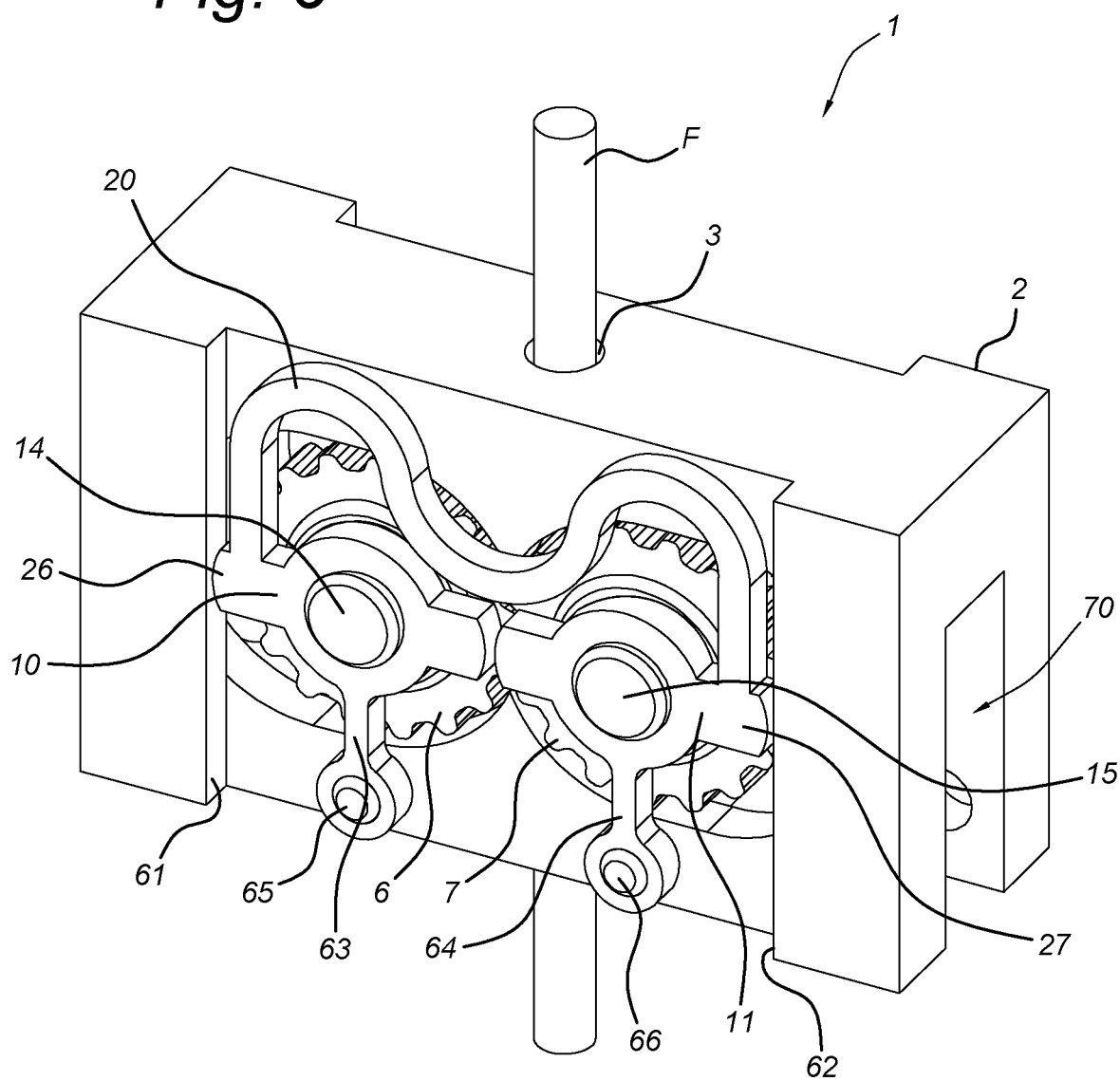
FIG. 6 shows a perspective view of the feeder according to an embodiment.

FIG. 6 shows a perspective view of yet another embodiment. In this embodiment, the feeder 1 comprises the feeder body 2 which comprises an indented middle section, which has a smaller thickness as compared to the outer ends of the feeder body 2 when seen from above. As a result, a cross section in a plane perpendicular to the feeder channel 3 has a shape similar to the Roman number 1 (i.e. I). This embodiment also shows similarities with the embodiment of FIG. 3. In FIG. 6, the suspension system S also comprises the first and second support portions 10, 11 which comprise holes to receive the roller shafts 14, 15. Furthermore, the suspension system S comprises the first and second lateral outward projections 26, 27. However in the embodiment of FIG. 6, the lateral outward projections 26, 27 will abut against outer walls or edges 61, 62 of the feeder body 2. Another difference is that in FIG. 6, the suspension system S comprises two support arms 63, 64 that are connected to the first and second support portions 10, 11 respectively. The support arms 63, 64 are pivotably connected to the feeder body 2, so that the support arms 63, 64 can pivot about pivoting points 65, 66.

Figure 7A:
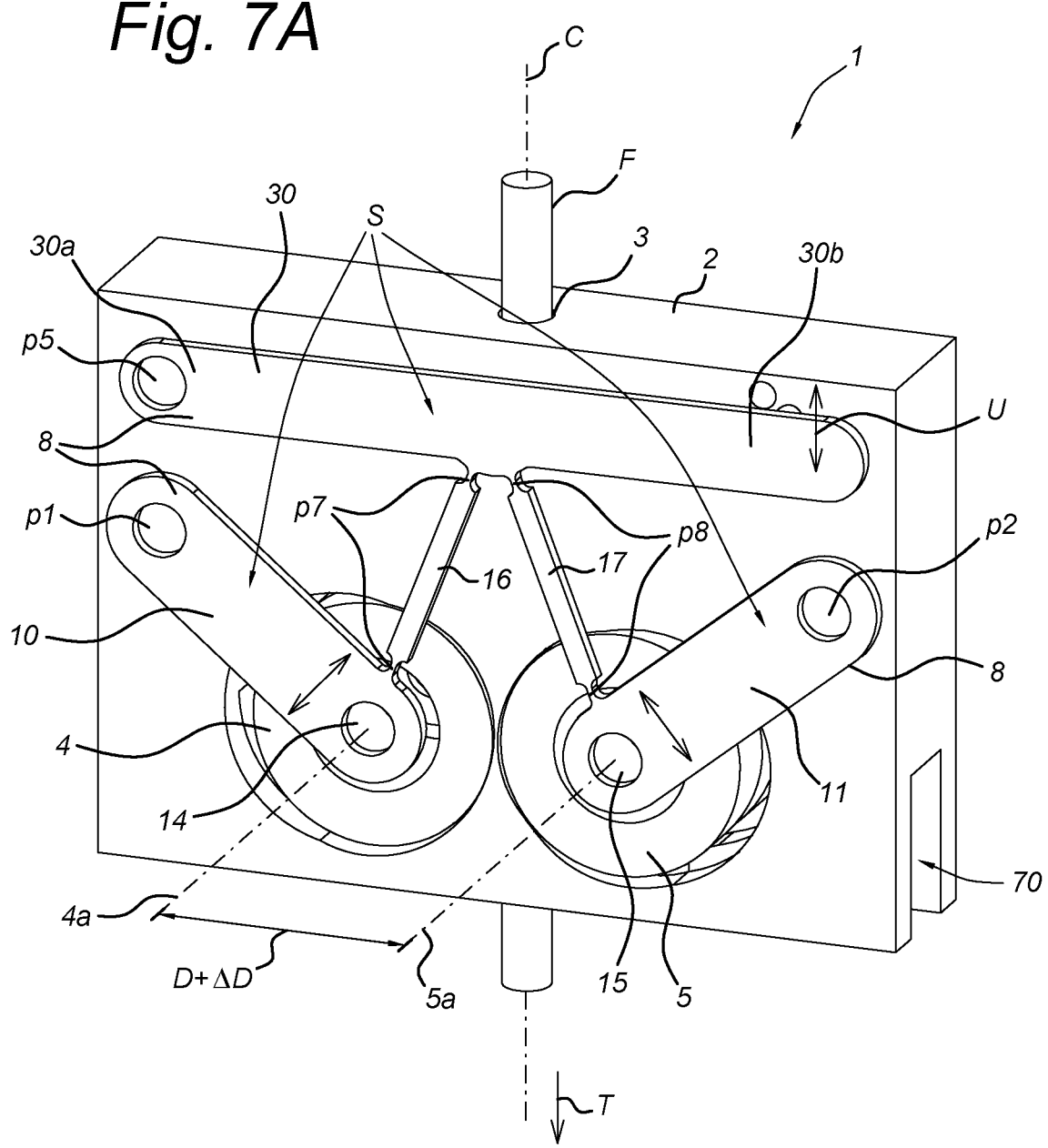
FIGS. 7A and 7B show opposing side views of an adjustable filament feeder device according to an embodiment of the present invention.
Figure 7B:
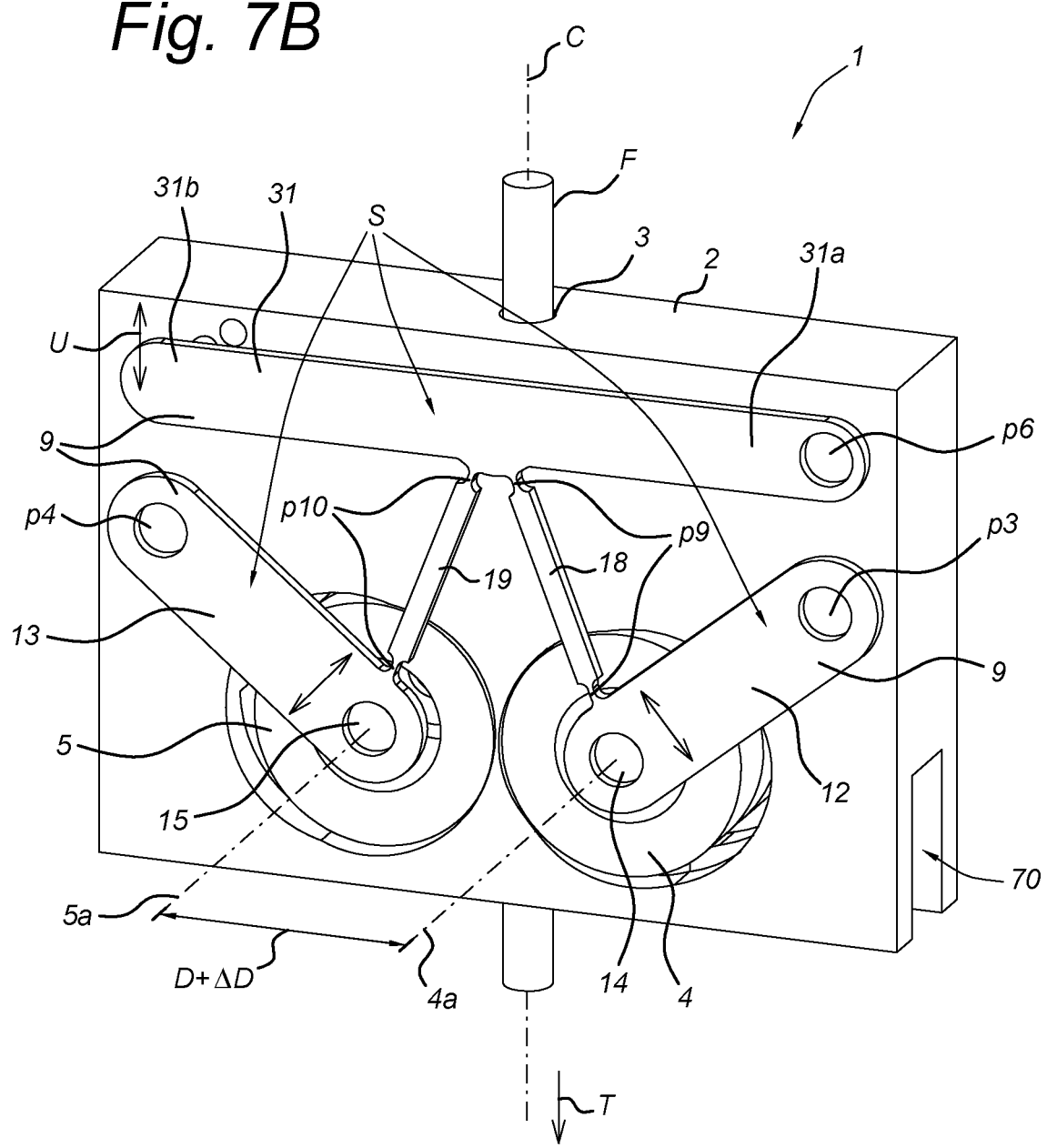

FIGS. 7A and 7B show opposing side views of an adjustable filament feeder 1 according to an embodiment of the present invention. In the embodiment shown, the first support plate 8 comprises an adjustable first lever portion 30 having a first lever end 30a and a second lever end 30b. The first lever end 30a is pivotally connected to the feeder block 2 at a first lever pivot point p5. The second support plate 9 then comprises an adjustable second lever portion 31 having a third lever end 31a and a fourth lever end 31b, wherein the third lever end 31a is pivotally connected to the feeder block 2 at a second lever pivot point p6.

As further depicted, the first lever portion 30 is connected to the first and second support portions 10, 11 between the first lever end 30a and the second lever and 30b for laterally positioning the first and second support portions 10, 11 with respect to the channel 3. The second lever portion 31 is connected to the third and fourth support portions 12, 13 between the third lever end 31a and the fourth lever and 31b for laterally positioning the third and fourth support portions 12, 13 with respect to the channel 3. In this embodiment the first and the second lever portions 30, 31 can be adjusted by simultaneously moving the second lever end 30b and the fourth lever end 31b up and down as indicated by the movement direction U. This pivots the first and second lever portions 30, 31 and as a result laterally moves the first, second, third and fourth support portions 10, 11, 12, 13, in particular the first and second grip rollers 4, 5 with respect to the channel 3. As depicted, in an embodiment the first, second, third and fourth support portions 10, 11, 12, 13 may be seen as swing arms that are pivotally arranged at the respective first, second, third and fourth pivot points p1, p3, p3, p4. By pivoting these swings arms 10, 11, 12, 13 allows for the aforementioned first and second lateral displacements Δd1, Δd2 of the first and second grip roller 4, 5.

In an advantageous embodiment, the second and fourth lever end 30b, 31b may be resiliently connected to the feeder block 2 to obtain biased engagement of the first and second grip rollers 4, 5 toward the channel 3, i.e. the filament F. Also, in a further embodiment the second and fourth lever ends 30b, 31b may be adjustably connected to the feeder block 2, allowing the aforementioned first and second channel distances d1, d2 with respect to a centre axis C to be set and wherein the adjustable connection exhibits resiliency to provide the variable first and second lateral displacements Δd1, Δd2. In an exemplary embodiment, the second and fourth lever end 30b, 31b may be connected to the feeder block 2 through one or more spring elements (not shown).

In the embodiments of FIGS. 7A and 7B, the first support plate 8 may comprise a first and a second pivot portion 16, 17 and wherein the second support plate 9 comprises a third and fourth pivot portion 18, 19, wherein the first and second pivot portion 16, 17 pivotally connect to the first and second support portion 10, 11, respectively, and the first lever portion 30. The third and fourth pivot portion 18, 19 pivotally connect to the third and fourth support portion 12, 13, respectively, and the second lever portion 31. In this embodiment the first, second, third and fourth pivot portions 16, 17, 18, 21 provide a symmetric arrangement of the first, second, third and fourth support portions 10, 11, 12, 13 with respect to the channel 3 by imposing a shape fixed linkage between the first and second lever portion 30, 31, and the first, second third and fourth support portions 10, 11, 12, 13.

In an advantageous embodiment, the first lever portion 30, the first and second pivot portions 16, 17, and the first and second support portions 10, 11 form a single piece; and wherein the second lever portion (31), the third and fourth pivot portions 18, 19, and the third and fourth support portions 12, 13 also form a single piece. This embodiment facilitates cost effective manufacturing and provide a thin suspension system S. For example, the first and second support plate 8, 9 may each be made of a sheet-based material (e.g. sheet metal) which is stamped such that the first, second, third, and fourth support portions 10, 11, 12, 13, the first, second, third and fourth pivot portions 16, 17, 18, 19, and the first and second lever portions 30, 31 are integrally formed. Here, each of the first, second, third and fourth pivot portions 16, 17, 18, 19 may be seen as a swing arm that is sufficiently thin to allow for resilient behaviour at first, second, third and fourth pivot points p7 p8, p9, p10. To increase resiliency, each of the first, second, third and fourth pivot portions 16, 17, 18, 19 may comprise two opposing narrowed ends for obtaining associated pivot points p7, p7, p9, p10 as shown.

Figure 8:
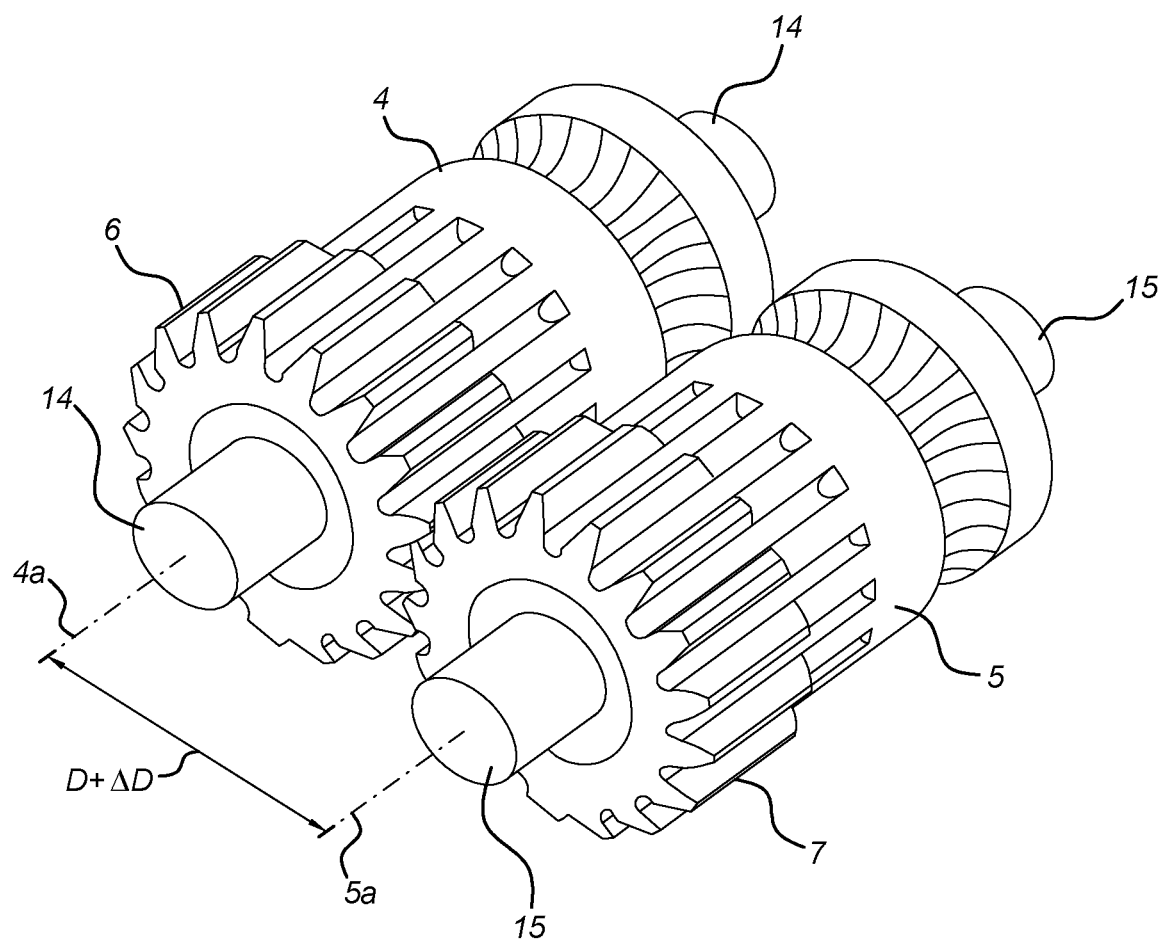
FIG. 8 shows a perspective view of two grip roller according to an embodiment of the present invention.

Referring now to FIG. 8, in this figure a perspective view of two grip roller 4, 5 is depicted according to an embodiment of the present invention. In this embodiment, the first drive gear 6 and the first grip roller 4 form a single piece, and wherein the second drive gear 7 and the second grip roller 5 form a single piece. That is, the first and second grip rollers 4, 5 are integrally formed with the first and second drive gears 6, 7, respectively, and journaled for rotation about the first and second roller shafts 14, 15. Although not shown here, the first and second roller shafts 14, 15 are suspended by the first and second support portions 11, 12 as depicted in FIGS. 1 to 7. In this embodiment the first and second drive gears 6, 7 are provided at a first end of the first and second roller shafts 14, 15 and wherein the first and second grip rollers 4, 5 are provided at an opposing second end of the first and second roller shafts 14, 15.

Figure 9:
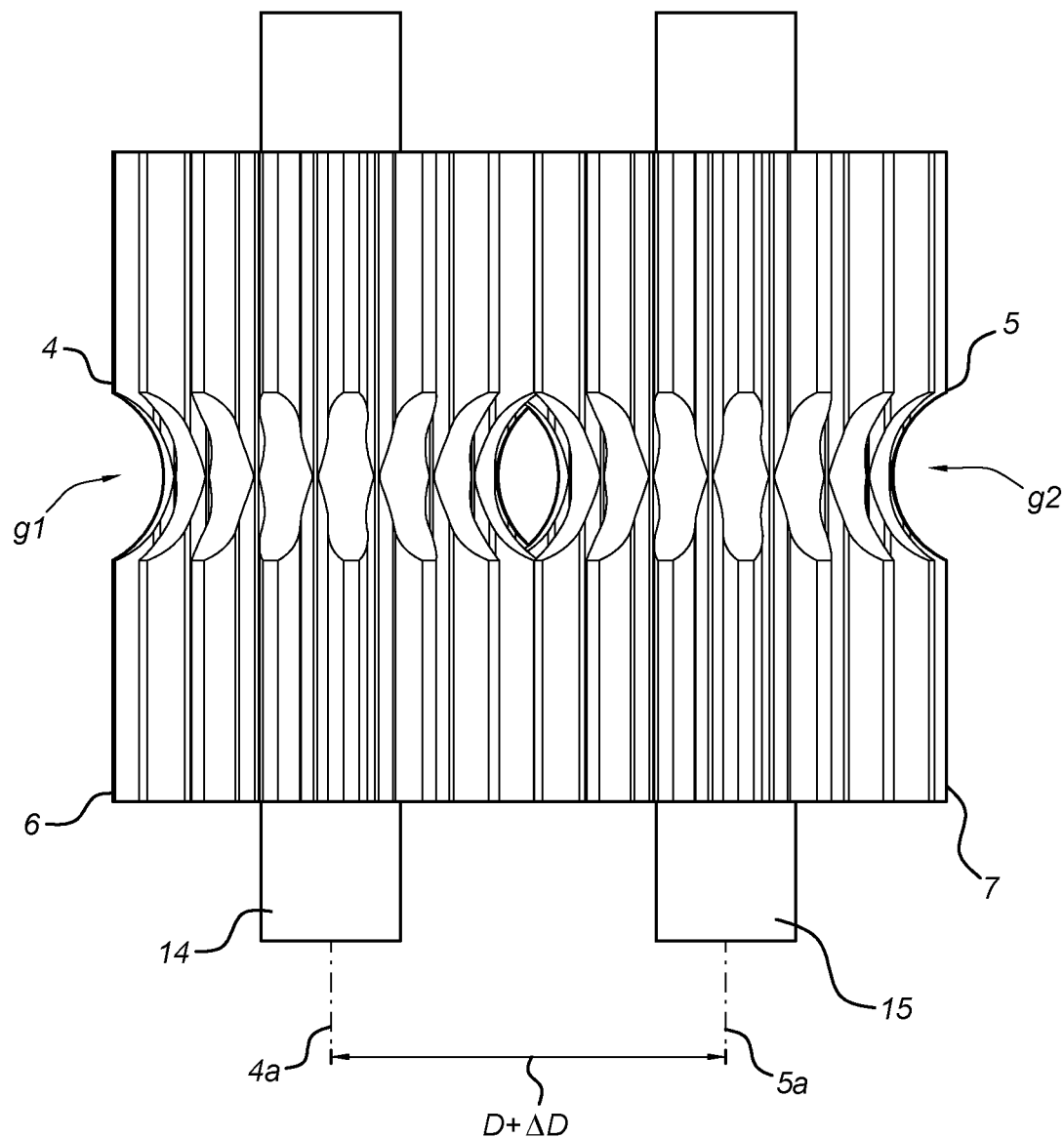
FIG. 9 shows a top view of two grip rollers according to another embodiment of the present invention.

FIG. 9 shows a top view of two grip rollers 4, 5 according to another embodiment of the present invention. In this embodiment, the first drive gear 6 and the first grip roller 4 form a single piece, and wherein the second drive gear 7 and the second grip roller 5 form a single piece. A circumferentially arranged round first groove g1 is provided to the first grip roller 4 and wherein a circumferentially arranged round second groove g2 is provided the second grip roller 5. The first and second grooves g1, g2 are configured for clamped engagement with the filament F. This embodiment provides rounded grooves g1, g2 for evenly distributed grip on a round filament F. Other cross sections of the grooves g1, g2 are possible such as parabolic or tapered shapes. Also, a geared engagement between the first and second drive gears 6, 7 on both sides of the grooves g1, g2 is provided, such that tooth forces imposed on the first drive gear 6 are symmetrically arranged with respect to the first groove g1 and tooth forces imposed on the second drive gear 7 are symmetrically arranged with respect to the second groove g2. As a result, the first and second roller shafts 14, 15 are evenly loaded along their lengths.

It is worth noting that in this embodiment the first grip roller 4 and the first drive gear 6 are integrally formed and may be seen as a single, elongated first drive gear 6 provided with the circumferential round first groove g1. Likewise, the second grip roller 5 and the second drive gear 7 are integrally formed and may be seen as a single, elongated second drive gear 7 provided with the circumferential round second groove g2.

Figure 10:
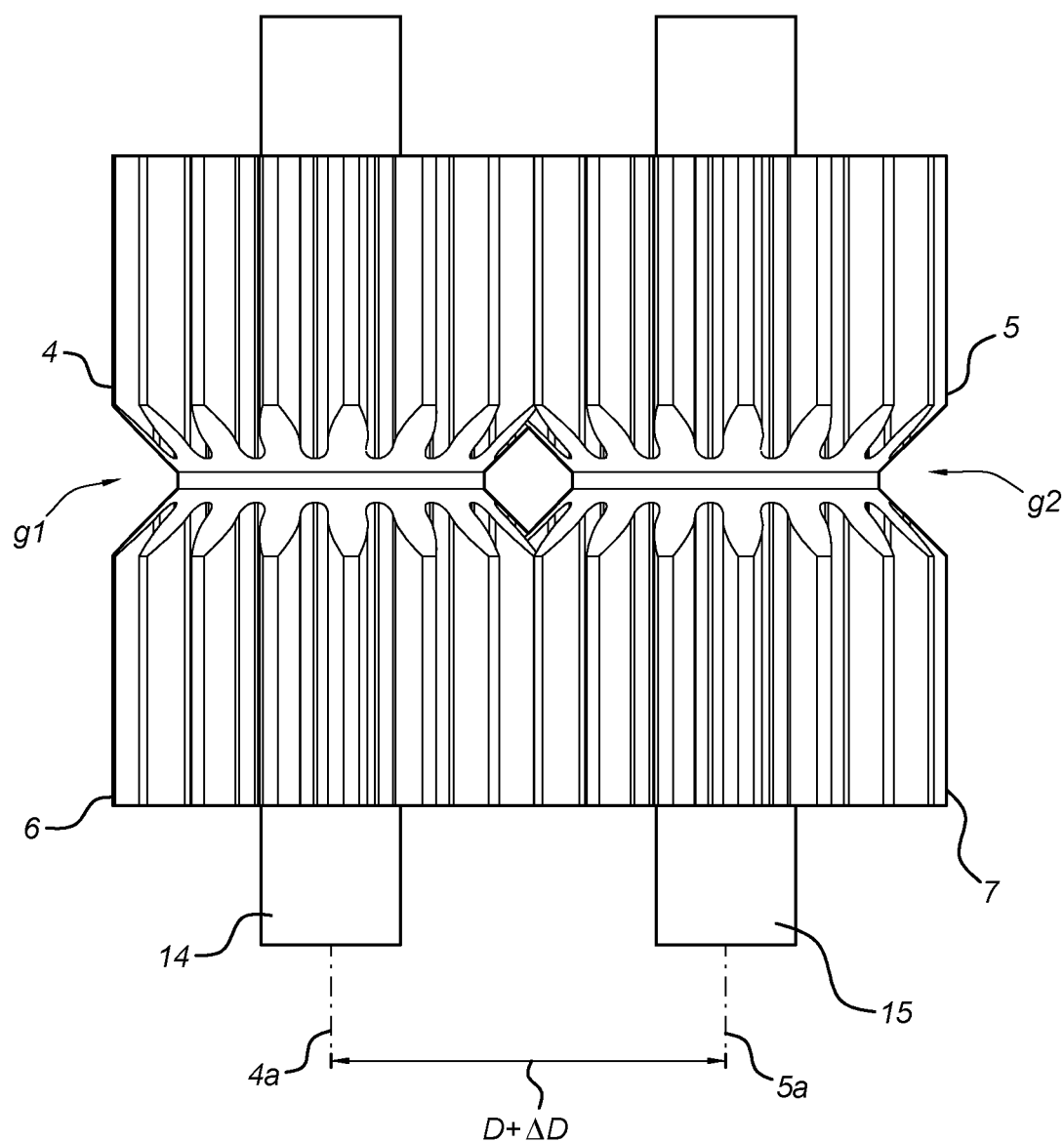
FIG. 10 shows a top view of two grip rollers according to a third embodiment of the present invention.

FIG. 10 shows a top view of two grip rollers 4, 5 according to a third embodiment of the present invention. In this embodiment the first drive gear 6 and the first grip roller 4 form a single piece provided with a circumferentially arranged V-shaped first groove g1. The second drive gear 7 and the second grip roller 5 form a single piece provided with a circumferentially arranged V-shaped second groove g2. The first and second groove g1, g2 are configured for clamped engagement with the filament F. This embodiment also provides geared engagement between the first and drive gears 6, 7 on both sides of the V-shaped grooves g1, g2. In particular, tooth forces imposed on the first drive gear 6 are symmetrically arranged with respect to the first groove g1 and tooth forces imposed on the second drive gear 7 are symmetrically arranged with respect to the second groove g2.

Figure 11:
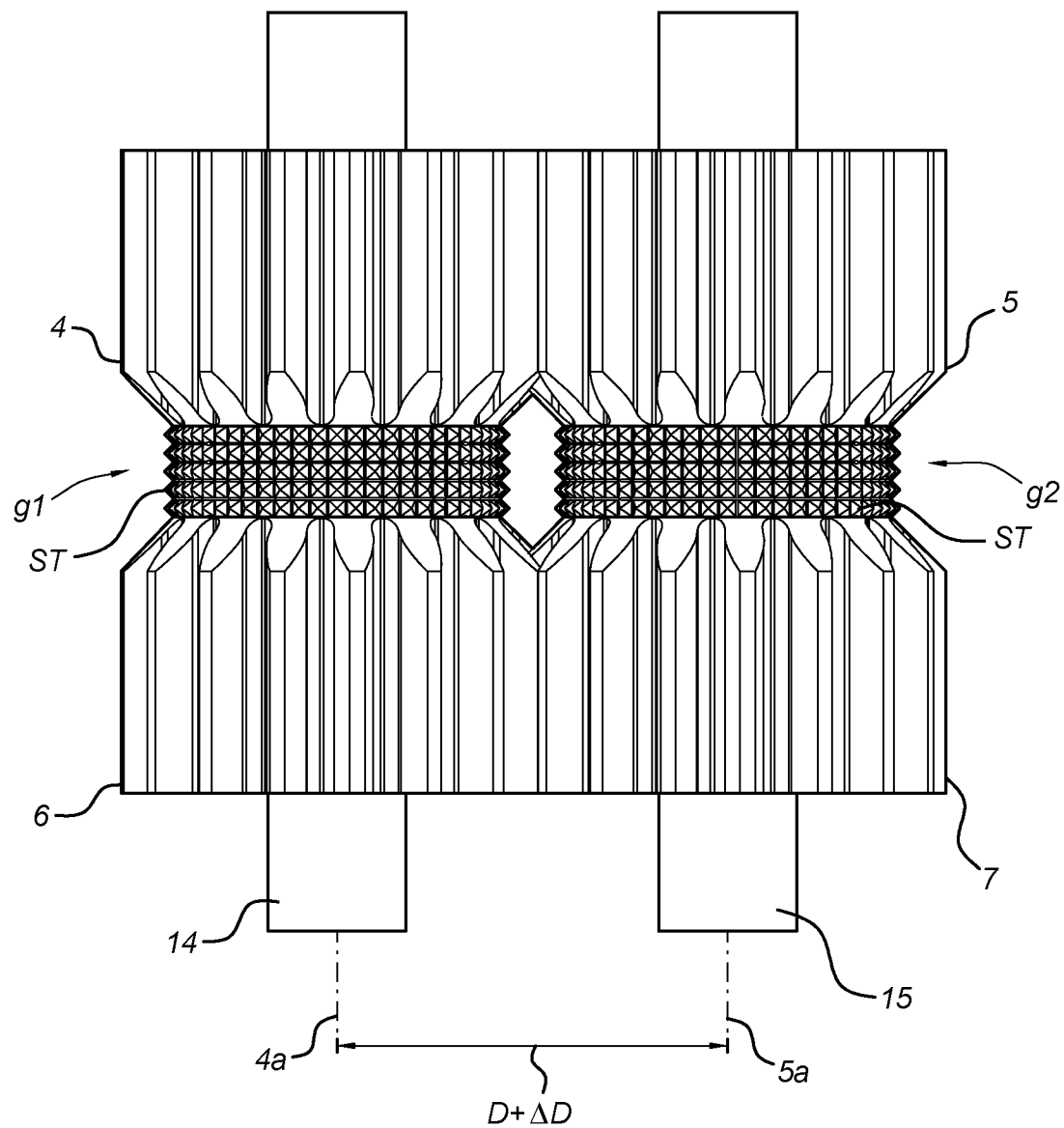
FIG. 11 shows a top view of two grip rollers according to a fourth embodiment of the present invention.

FIG. 11 shows a top view of two grip rollers 4, 5 according to a fourth embodiment of the present invention. In this embodiment, each of the first and second V-shaped grooves g1, g2 of the embodiment of FIG. 10 further comprises a flattened bottom part provided with a protruding surface texture ST configured to increase grip onto the filament F.

For the embodiments of FIGS. 9 to 11, by choosing round or V-shaped grooves g1, g2, with or without surface texture, the grip onto the filament F can be tailored to achieve particular feed performance.

Figure 12:
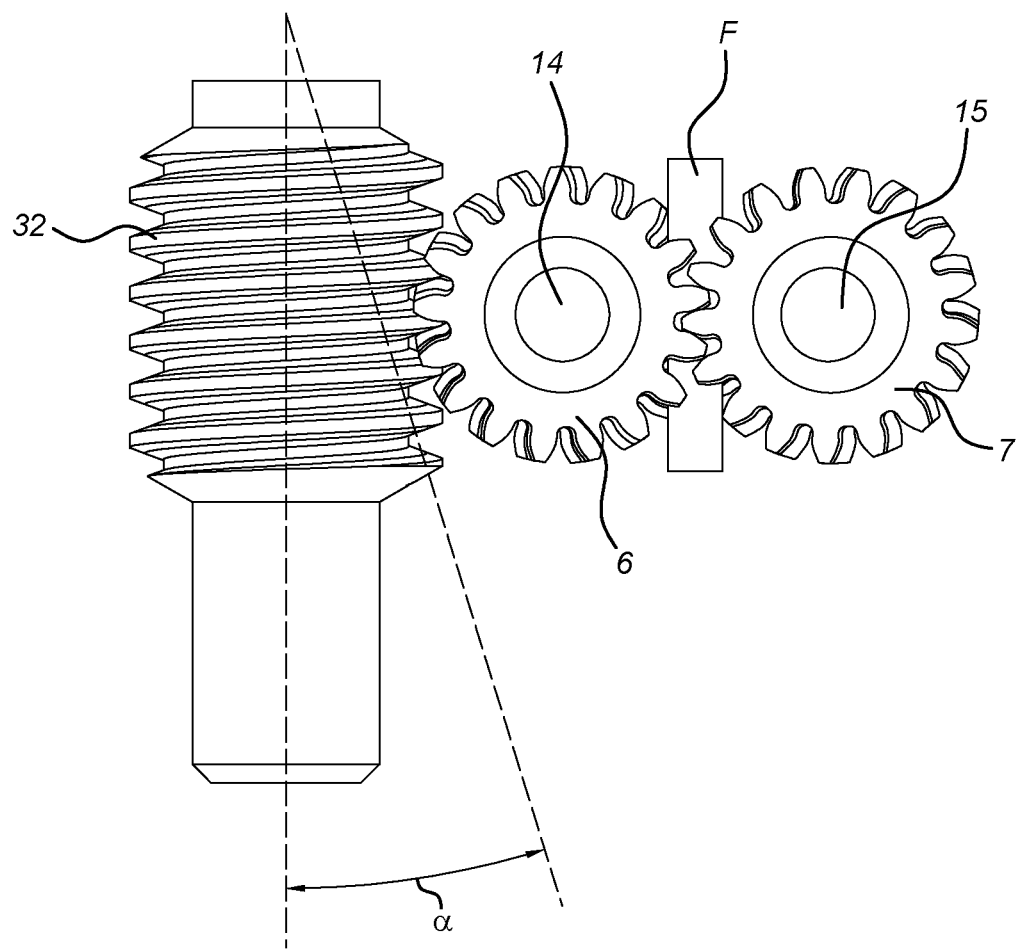
FIG. 12 shows a main drive gear according to an embodiment of the present invention.

FIG. 12 shows a main drive gear 32 according to an embodiment of the present invention. In the embodiment shown, the filament feeder 1 may comprise a driven worm gear 32 in meshed engagement with the first or the second drive gear 6, 7. The worm gear allow 32 allows for a compact design and can be arranged in various angles ($\alpha$) while maintaining meshed engagement with the first or second drive gear 6, 7.

The filament feeder 1 of the present invention can be used within a print head, wherein the filament feeder 1 feeds the filament F to a nozzle of the print head which is arranged to deposit molten filament F onto a build stage.

The filament feeder of the present invention can also be used in a FFF printing device for transport of the filament F to the print head via a Bowden tube.

FIG. 13 schematically shows an FFF printer 33 comprising the filament feeder 1. As depicted, the filament feeder 1 allows the filament F to be transported to a nozzle 35 of the print head 34 by virtue of the first and second grip rollers 4,5.

From FIG. 13 it is likewise clear that the print head 34 may comprise the filament feeder 1 for transporting the filament F, wherein the print head 34 may be configured to deposit the filament F onto a build stage 36 of the FFF printer 33.

The present invention has been described above with reference to a number of exemplary embodiments as shown in the drawings. Modifications and alternative implementations of some parts or elements are possible, and are included in the scope of protection as defined in the appended claims.

The invention claimed is:

1. A filament feeder for use in a fused filament fabrication printer, the filament feeder comprising:
   a feeder body which comprises a channel for guiding a filament there through;
   a first and a second driven grip roller arranged on opposing sides of the channel for clamped engagement with the filament, wherein the first grip roller is rotationally arranged about a first roller axis and the second grip roller is rotationally arranged about a second roller axis;
a first drive gear for driving the first grip roller, the first drive gear being rotatably arranged about the first roller axis;
a second drive gear for driving the second grip roller, the second drive gear being rotatably arranged about the second roller axis,
a suspension system for suspension of the first and second grip roller and of the first and second drive gear,
wherein the suspension system is arranged to allow lateral movement of the first and second grip rollers with respect to the channel for providing a variable distance between the first and second roller axes,
wherein the suspension system comprises a first and a second support plate mounted on opposing sides of the feeder body,
wherein the first support plate comprises a first support portion and a second support portion, and wherein the second support plate comprises a third support portion and a fourth support portion;
wherein the first and second grip rollers each comprise a first roller shaft and a second roller shaft, respectively,
wherein the first roller shaft is suspended by the first and third support portions and the second roller shaft is suspended by the second and fourth support portions,
wherein the first, second, third, and fourth support portions are laterally movable with respect to the channel, and
wherein the first drive gear is arranged on the first roller shaft, and the second drive gear is arranged on the second roller shaft, and the first drive gear is in engagement with the second drive gear when the first and second grip rollers are in clamped engagement with the filament.

2. The filament feeder according to claim 1,
wherein first roller axis is arranged at a first channel distance with respect to a centre axis of the channel and wherein second roller axis is arranged at a second channel distance with respect to the centre axis of the channel, and
wherein the first and second channel distances are variable over substantially equal first and second lateral displacements, respectively.

3. The filament feeder according to claim 1, wherein the suspension system comprises resilient suspension members arranged to resiliently bias the first and the second grip rollers to the filament.

4. The filament feeder according to claim 1, wherein the first, second, third and fourth support portions are pivotally arranged in a respective plane of the first and second support plate.

5. The filament feeder according to claim 1, wherein the first support plate comprises a first and a second pivot portion and wherein the second support plate comprises a third and fourth pivot portion,
wherein the first and second pivot portion pivotally connect the first support plate to the first and second support portion, and
wherein the third and fourth pivot portion pivotally connect the second support plate to the third and fourth support portion.

6. The filament feeder according to claim 5, wherein the first support plate, the first and second support portion and the first and second pivot portion form a single piece, and wherein the second support plate, the third and fourth support portion and the third and fourth pivot portion form a single piece.

7. The filament feeder according to claim 5, wherein the first support plate, comprises a laterally resilient first biasing portion connecting the first and second support portion, and wherein the second support plate comprises a laterally resilient second biasing portion connecting the third and fourth support portion.

8. The filament feeder according to claim 7, wherein the first biasing portion and the first and second support portion form a single piece, and wherein the second biasing portion and the third and fourth support portion form a single piece.

9. The filament feeder according to claim 5, wherein the first support portion comprises a first lateral inward projection and wherein the second support portion comprises a second lateral inward projection, wherein the suspension system is configured to allow abutment of the first and second lateral inward projections when the variable distance reaches a lower limit.

10. The filament feeder according to claim 5, wherein the third support portion comprises a third lateral inward projection and wherein the fourth support portion comprises a fourth lateral inward projection, wherein the suspension system is configured to allow abutment of the third and fourth lateral inward projections when the variable distance reaches a lower limit.

11. The filament feeder according to claim 5, wherein the first support portion comprises a first lateral outward projection and wherein the second support portion comprises a second lateral outward projection, and wherein the suspension system S is configured to allow abutment of the first and second lateral outward projections with edges of the first support plate or of the feeder body when the variable distance reaches an upper limit.

12. The filament feeder according to claim 5, wherein the third support portion comprises a third lateral outward projection and wherein the fourth support portion comprises a fourth lateral outward projection, and wherein the suspension system is configured to allow abutment of the third and fourth lateral outward projections with the feeder body when the variable distance reaches an upper limit.

13. The filament feeder according to claim 1, wherein the first support plate comprises an adjustable first lever portion having a first lever end and a second lever end, the first lever end being pivotally connected to the feeder body at a first lever pivot point, and wherein
the second support plate comprises an adjustable second lever portion having a third lever end and a fourth lever end, the third lever end being pivotally connected to the feeder body at a second lever pivot point,
wherein the first lever portion is connected to the first and second support portions between the first lever end and the second lever and for laterally positioning the first and second portions with respect to the channel, and
wherein the second lever portion is connected to the third and fourth support portions between the third lever end and the fourth lever and for laterally positioning the third and fourth support portions with respect to the channel.

14. The filament feeder according to claim 13, wherein the first support plate comprises a first and a second pivot portion and wherein the second support plate comprises a third and fourth pivot portion,
wherein the first and second pivot portion pivotally connect the first and second support portion, respectively, and the first lever portion, and wherein the third and fourth pivot portion pivotally connect to the third and fourth support portion, respectively, and the second lever portion.

15. The filament feeder according to claim 14, wherein the first lever portion, the first and second pivot portions, and the first and second support portions form a single piece, and wherein the second lever portion, the third and fourth pivot portions, and the third and fourth support portions form a single piece.

16. The filament feeder according to claim 13, wherein the second and fourth lever ends are resiliently connected to the feeder body.

17. The filament feeder according to claim 1, wherein the first drive gear and the first grip roller form a single piece provided with a circumferentially arranged round first groove, and wherein the second drive gear and the second grip roller form a single piece provided with a circumferentially arranged round second groove, wherein the first and second groove are configured for clamped engagement with the filament.

18. The filament feeder according to claim 1, wherein the first drive gear and the first grip roller form a single piece provided with a circumferentially arranged V-shaped first groove, wherein the second drive gear and the second grip roller form a single piece provided with a circumferentially arranged V-shaped second groove, wherein the first and second grooves are configured for clamped engagement with the filament.

19. The filament feeder according to claim 18, wherein the first and second groove each comprise a flattened bottom part provided with a protruding surface texture configured to increase grip onto the filament.

20. The filament feeder according to claim 1, further comprising a driven worm gear in meshed engagement with the first or the second drive gear.

21. A print head comprising a filament feeder according to claim 1.

22. An FFF printer comprising a filament feeder according to claim 1.

* * * * *